Inventor
Halsey W. Cory
By Robert B Benson
Attorney

United States Patent Office 3,290,759
Patented Dec. 13, 1966

3,290,759
METHOD OF MANUFACTURING DYNAMO-
ELECTRIC MACHINES
Halsey W. Cory, Cincinnati, Ohio, assignor to Allis-
Chalmers Manufacturing Company, Milwaukee, Wis.
Filed Sept. 26, 1963, Ser. No. 311,836
2 Claims. (Cl. 29—155.5)

This invention relates generally to dynamoelectric machines and a method of winding such a machine. More specifically, this invention relates to a method of induction type motor and generators intended to the operated from a three phase source of alternating current power. Attempts have been made to develop a suitable winding that can be machine wound directly on the core. Some success has been achieved in using machines to assemble concentric windings on cores. However, the operating characteristics of motors having this type of winding are inferior to the characteristics to be derived from a properly lap wound motor.

Most common varities of electric motors fundamentally embody the same principle of operation, i.e., the positioning of a current carrying conductor in a magnetic field. The flow of current in the conductor produces magnetic lines of force concentric therewith which react with the magnetic lines of force of the field to produce a physical force tending to move the conductor out of the field. A classic variety of an electric motor for operation from a source of alternating current is the induction motor in which one of the core members, generally the rotor, is provided with a short circuited winding and the other core member, generally the stator, is provided with a field exciting winding. With this arrangement, energization of the field exciting winding form a source of alternating current induces a heavy current flow in the short circuited winding by transformer action. This heavy current flow cooperating with the magnetic flux produced by the field exciting winding provides a rotational force. Mere energization of the field exciting winding from a single phase source of alternating current will not, however, provide the requisite rotational force initially to start an induction motor since the alternating magnetic field and the resultant induced alternating current in the short circuited winding produce alternating equal and opposite rotational forces; a rotating magnetic field must be provided in order to start an induction motor. Such a rotating magnetic field is most conveniently provided by energizing the field exciting winding of the machine from a source of polyphase alternating current, such as the three phase alternating current power commercially supplied by utilities in the United States.

In the case of an induction motor to be energized from a source of polyphase alternating current, the field exciting winding conventionally is divided into a plurality of portions or phases, generally equal in number to the number of phases in the source of polyphase alternating current. In the case of a machine to be operated from a three phase source of alternating current, the field exciting winding conventionally is formed of three phases which may be connected either in Y or Δ across the three phase source. Each phase of the field exciting winding in turn conventionally comprises one or more pairs of sections or "pole groups" each in turn comprising one or more individual coils; the winding sections or pole groups of each phase are disposed on a magnetic core member so as to form the desired number of magnetic poles, e.g., in the case of a four pole motor, each winding phase will comprise four sections or pole groups, with each of the pole groups being formed of one or more individual coils.

A magnetic core member on which the field exciting winding is positioned is, in the case of polyphase induction motors, most commonly the stator member, concentrically surrounding the rotor member and defining an air gap therewith. The stator core member of conventional polyphase alternating current induction motors has a plurality of winding slots extending radially inwardly from its surface which defines the air gap with the rotor member. The slots are usually equally spaced around the air gap defining surface or bore. The coils which form the respective winding phases have their sides disposed in these winding slots, and a machine of this type is customarialy referred to as having a "distributed" winding. In the past, polyphase alternating current induction motors have commonly been provided with a so-called "lap" winding. In the lap winding, each coil has a first side disposed in the bottom of a winding slot and second side disposed over the first side of another coil. This overlapping relationship of the coils proceeds completely around the stator core member until all the coils are in place. Normally, these coils are preformed and then placed into the stator core slots by hand which is a time consuming and expensive operation.

Another form of winding arrangement which has been in common use for many years in single phase alternating current induction motors and which has lately found increasing application in special polyphase alternating current induction motors is the so-called "concentric" winding. In the concentric winding, all of the coils comprising a given pole group are concentrically arranged. Concentric windings lend themselves much more readily than lap windings to machine winding directly into the slots of the stator core member. However, the operating characteristics of the lap wound machine are preferred over the operating characteristics of a concentrically wound machine in most applications.

One of the problems with machine winding motor cores with three phase windings in the past was that the winding machines were complex and required frequent revising or setting and still did not completely solve the problem of lifting the coils to position later wound coils. This is a hand operation and coupled with the complex setting of the winding heads to assure mechanical balance, rendered machine winding of three phase coils impractical.

The motor of this invention incorporates a winding which is both physically symmetrical and electrically balanced. The coils are arranged in the stator in such a manner that the winding can be machine wound directly on to the core. According to the method of this invention, a plurality of coils may be wound simultaneously into the core. This is accomplished by placing individual winding heads a predetermined distance apart to assure physical symmetry between coils and coil groups and then indexing the core relative to the heads in a predetermined sequence to assure both physical symmetry and electrical balance. The coils wound according to this invention have the same number of turns and the same coil pitch. Hence, the motor of this invention is extremely simple, can be easily machine wound and has operating characteristics which are better than a concentrically wound machine and substantially equal to a conventional lap wound machine.

Therefore, it is the object of this invention to provide a new and improved method for winding a dynamo-electric machine.

Another object of this invention is to provide a new and improved method for winding the stator coils of a three phase induction motor.

Another object of this invention is to teach a new and improved method of winding a stator for an induction motor which provides operating characteristics substantially equivalent to the operating characteristics of a conventional lap wound motor.

Other objects and advantages will be apparent from the following description when read in connection with the accompanying drawings, in which:

FIG. 8 is a diagrammatic view of the stator core showing the location of the coils positioned in accordance with this invention in a stator core having thirty-six slots rather than the twenty-four slots as indicated in the other figures of this drawing.

Referring more specifically to the drawings by characters of reference, this invention is illustrated in FIGS. 2–6 in connection with an induction motor having a twenty-four slot, four pole stator with a one to six pitch. However, it will be obvious to those familiar with the art that different pitches may be used as well as various slotting combinations and number of poles.

Figure 1:
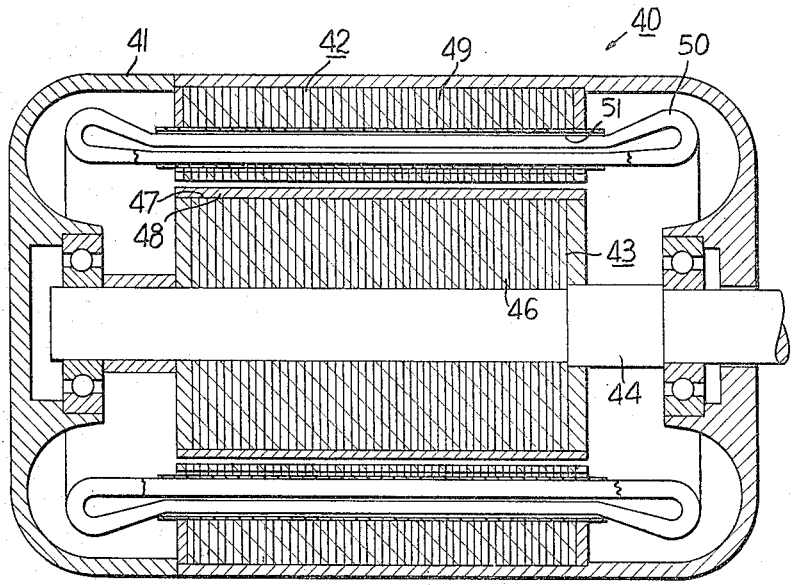
FIG. 1 is a cross sectional view of a three phase induction motor incorporating the winding of this invention.

The motor 40 as shown in FIG. 1 comprises generally a casing or yoke 41, an annular stator 42 surrounding a rotor 43 mounted on a shaft 44 which is in turn journaled in bearings 45 mounted in the casing 41. The rotor has a laminated iron core 46 and a plurality of arcuately spaced winding slots 47 near its outer periphery into which is die cast a squirrel cage winding 48 such as is common in industrial induction motors. The stator 42 also has a laminated iron core 49 with a so-called distributed winding 50 positioned in arcuately spaced winding slots 51 in the core.

The winding of this invention will be explained in detail in connection with a standard three-phase machine but would be applicable to a motor utilizing any polyphase winding system. Since we are discussing a three phase motor, the winding of this invention would be particularly applicable in connection with cores in which the number of winding slots is a multiple of six. Preferably, each individual coil of the winding is the same pitch and has substantially the same number of turns. In addition, each coil has the same pitch and in this case is shown as spanning five teeth.

The winding of this invention is particularly adaptable to be wound directly on the core by a winding machine. Hence, the winding will be described as if it were to be machine wound on the core by a machine having three distinct winding heads 55a, b and c positioned 120° apart. Each winding head winds separate and distinct coils simultaneously with the winding of coils by the other heads. The coils electrically provide the desired number of poles and operating characteristics. To further simplify the description of the winding operation and assembly in connection with the first embodiment, the coils wound at the same time will be identified with the same coil number with an added letter to distinguish it from the other simultaneously wound coils. It is, of course, understood that each of the individual coils has appropriate leads extending therefrom which can be interconnected with other coils in the machine to form the desired electrical connections which determine the voltage at which the motor will be run, the type of connection, the number of poles and the like.

Figure 6:
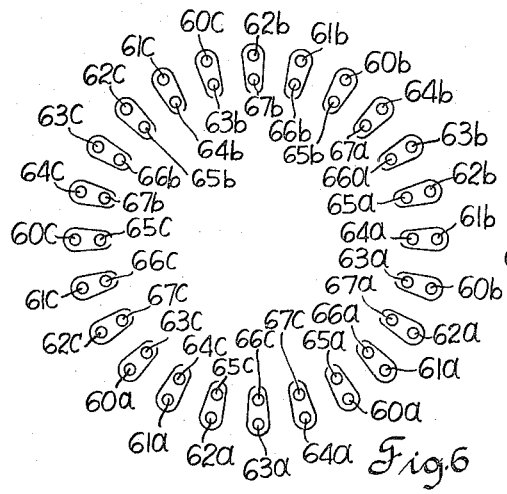
FIG. 6 is a diagrammatic view of the stator core of this invention showing the location of the various coils in the winding slots of the stator core.
Figure 7:
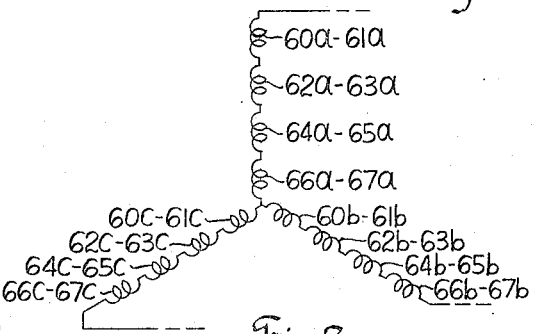
FIG. 7 is a diagrammatic view showing how the coils are connected to form a common Y connection.

The sequence of winding and positioning the coils in the stator core is illustrated in steps in FIGS. 2 through 6 and a schematic diagram in FIG. 7 illustrates the coils connected in a Y connection. In this core having twenty-four slots, each head winds a separate and distinct phase winding.

The core is mounted in an appropriate vise and the winding heads 55a, b and c (shown only in FIG. 2) of the machine are positioned within the bore of the core 120° apart and are initially positioned to wind coils 60a, b and c in slots 1–6, 9–14 and 17–22, respectively. When these coils have been wound, the machine is indexed to position the winding heads to wind a coil in the next adjacent set of slots. This can be done by rotating either the winding heads or the core, but in the preferred operation, because of the complexity of winding heads, the core is rotated in a clockwise direction through an angle equal to the angle between the center lines of adjacent slots. Then the coils 61a, b and c are wound into slots 2–7, 10–15 and 18–23. All of the coils 60 and 61 have both sides located in the bottoms of their respective slots and are referred to as being wound bottom to bottom. This completes the winding of the first group of coils and suitable phase insulation is positioned on top of the portions of the coils extending beyond the ends of the core.

The core is then indexed one notch as explained above and the second group of coils are wound into the appropriate winding slots. This group of coils consists of coils 62a, b and c, and 63a, b and c. First coils 62a, b and c are wound in slots 3–8, 11–16 and 19–24, respectively. These coils also are wound bottom to bottom. The machine is then indexed and the coils 63a, b and c are wound in slots 4–9, 12–17 and 20–1, respectively. It is noted here that these coils 63a, b and c have their first side, that is the side in slots 4, 12 and 20, formed in the bottom of the winding slots whereas the other side of the coils is formed in the top of the slots 9, 17 and 1 over the sides of previous wound coils 60. This completes the winding of the second group of coils and suitable insulation paper is again placed over the portions of the coils 62, 63 that extend beyond the ends of the core.

The next coil group consisting of coils 64 and 65 are now ready to be wound. Again the core is indexed one notch and the coils 64a, b and c are positioned in slots 5–10, 13–18 and 21–2, respectively. Again it is noted that with these coils the first side in slots 5, 13 and 21 is positioned in the bottom of the slots whereas the other side is positioned at the top of the slots on top of the first side of coils 61. The core is then indexed and coils 65a, b, and c are wound into slots 6–11, 14–19 and 22–3, respectively. It is noted here that all the coils 65 have both sides positioned in the top of the respective winding slots because the bottom portions of these slots have already been filled with the previous wound coils 60 and 62. This completes the winding of the third group of coils and again suitable insulating material is positioned over the portions of the coils in this group which extend beyond the end of the core.

The core is again indexed one notch and the winding of the fourth, and in this case the last group of coils, is commenced. In this group, coils 66a, b and c are wound in the top portions of solts 7–12, 15–20 and 23–4, respectively. As can be seen most clearly in FIG. 6, the bottoms of these slots are filled with coils 63 and 61. The core is again indexed one notch and coils 67a, b and c are wound in the tops of winding slots 8–13, 16–21 and 24–5, respectively. Again referring to FIG. 6, the bottoms of these slots are filled with coils 64 and 61. The winding job is then completed by placing a suitable layer of insulating paper over the end turn portions of the coils in group 4.

As was mentioned earlier, the coils are connected to other coils in their groups which have leads extending therefrom. These groups of coils are then connected into their proper phases and connected to a source of electricity to form the desired number of poles and to balance the motor electrically.

It should be noted that each of the coils have exactly the same coil pitch. That is, it extends from one slot to another six slots away and hence spans a total of five teeth. Also, all the coils have substantially the same number of turns, and hence all of the coils of the machine can be wound into the stator without changing the setting on the winding head of the machine. Since the cores were wound simultaneously by heads 120° apart, each phase winding has the same number of coils bottom to bottom, top to top and bottom to top and hence, is precisely positioned physically relative to each other so as to form a perfect mechanical balance. The wires are hooked up to direct the current through the coils in the proper sequence to form a three phase winding having the desired number of poles and automatically, electrically balance the winding. Hence, the machine can be completely machine wound and have a three phase winding that is mechanically and electrically balanced.

The illustration in FIG. 6 clearly illustrates the location of each side of each coil in its respective slot and FIG. 7 illustrates a schematic diagram connecting the various coils in each phase.

FIG. 8 is a view similar to FIG. 6 showing the location of the sides of the coils of a three phase winding wound according to this invention in a core having thirty-six slots. This winding is also designed to be wound by three winding heads operating simultaneously and positioned 120° apart. The coils are wound in coil groups of one or two coils per phase per group as indicated by the coil numbers. For example, coils 71a, b and c are the only coils in the first group to be wound. Coils 72a, b and c and 72'a, b and c are wound in the second group, coils 73a, b and c in the third coil group and coils 74a, b and c and 74'a, b and c are in the fourth coil group and so on in alternating sequence to coils 78a, b and c and 78'a, b and c in the twelfth group.

There are a large number of variations of windings that can be wound by the method of this invention. Since the windings are wound by three heads simultaneously forming coils 120° apart, the coil pitches can be chosen relative to the number of slots in the core to produce a winding that is inherently mechanically and electrically balanced. Furthermore, a balanced lap winding can be formed without lifting any previously wound coils to place other coils beneath them in the slots.

Figure 2:
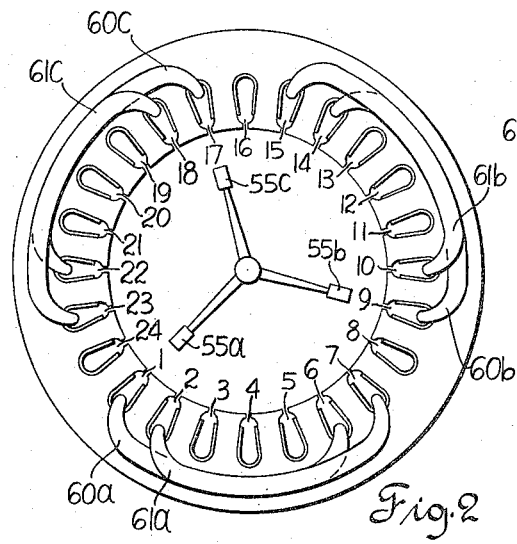
FIG. 2 is a cross sectional view of a stator core of this invention showing the first sets of field coils positioned in the core.
Figure 3:
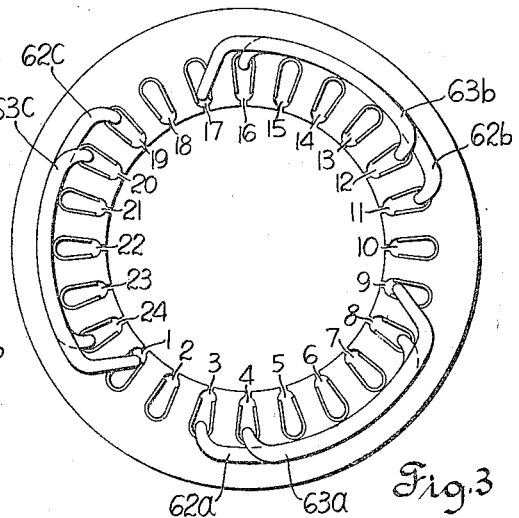
FIGS. 3 through 5 are cross sectional views of the stator of this invention showing progressively the various sets of coils being positioned in the stator.
Figure 4:
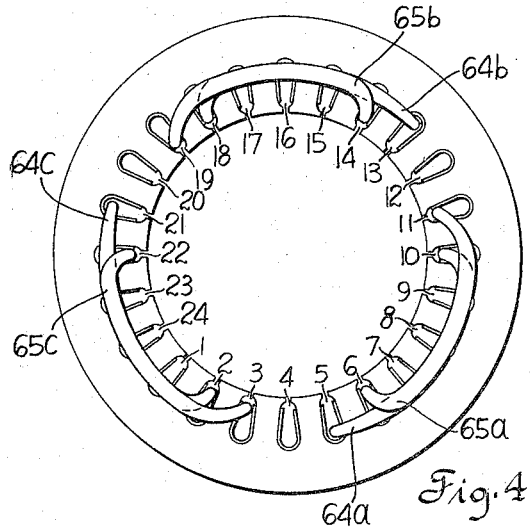
Figure 5:
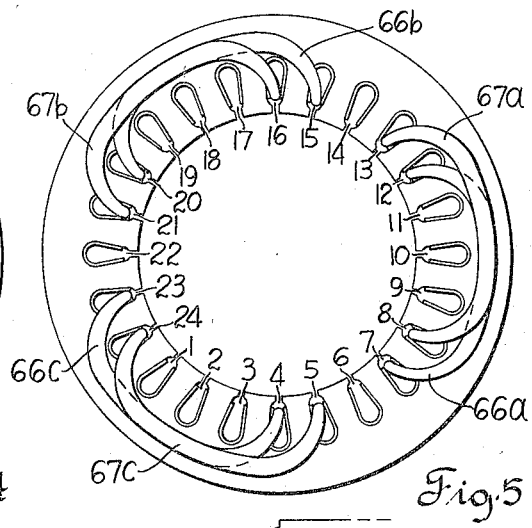

An example of such a variation can be illustrated in conection with the twenty-four slot core of FIG. 2. In such a core, the winding heads can be indexed two slots after each coil is wound. If the coil pitch is an odd number such as five (i.e., coil is in slots 1–6), the winding can be formed with all coils either top to top or bottom to bottom.

From the above, it can be seen that because the three phase winding is formed by three winding heads operating simultaneously, the winding can be automatically mechanically balanced. By choosing the proper coil pitch and indexing, an electrically and mechanically balanced lap winding can be formed without lifting any coil from the core to place another coil. Hence, winding according to the method of invention is almost completely automatic machine winding.

Although but two embodiments have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performer, I declare that what I claim is:

1. The method of winding a three phase winding in the core of a dynamoelectric machine having a total number of winding slots exceeding three and equally divisible by three comprising the steps of: (a) placing three winding heads 120° apart adjacent winding slots in said core; (b) winding three coils simultaneously until said slots are approximately one-half full of coil sides with both sides of each coil in the bottom of the slots; (c) indexing said core in one direction through an angle equal to the angle between adjacent slots of said core; (d) repeating steps (b) and (c) until one-third of said slots have coil sides therein; (e) indexing said core in said direction through an angle equal to the angle between adjacent slots of said core; (f) winding three coils simultaneously with one side of each coil in the bottom of a slot and the other side of each coil in the top of a slot positioned over one of said previously wound coils; (g) repeating steps (e) and (f) until one-third of said core slots have one coil side in the bottom of the slot and the other coil side in the top of a core slot; (h) indexing said core in said direction through an angle equal to the angle between adjacent slots of said core; (i) winding three coils simultaneously with both sides of each coil in the top of the slots overlapping previously wound coil sides; (j) repeating steps (h) and (i) until the remaining one-third of said core slots have coil sides therein; (k) interconnecting the coils electrically to provide an electrically balanced three phase winding.

2. The method of winding a three phase, four pole winding in the core of a dynamoelectric machine having twenty-four winding slots opening to the bore of the core comprising the steps of: (a) placing three winding heads 120° apart adjacent winding slots in said core; (b) winding three coils simultaneously with both sides of each coil in the bottom of the slots; (c) indexing said core one step by rotating said core clockwise through an angle equal to the angle between the center lines of adjacent winding slots to position said heads opposite the next winding slots; (d) winding three more coils simultaneously with both sides of the coils positioned in the bottom of the slots to form a first group of coils; (e) applying phase insulation to the portion of the coils extending beyond the ends of the core; (f) indexing said core clockwise one step; (g) winding three coils simultaneously with both sides of each coil in the bottom of the slots; (h) indexing the core clockwise one step; (i) winding three coils simultaneously with one side of each coil in the bottom of each slot and the other side in the top of a slot positioned over one of said previously wound coils to form a second group of coils; (j) insulating the portions of the coils in said second group extending beyond the ends of said core; (k) indexing said core one step; (l) winding three coils simultaneously with the bottom of one side of the coils in the bottom of a slot and the other side of the coils in the top of a slot over a previously wound coil; (m) indexing said core one step; (n) winding three coils simultaneously with both sides of each coil in the top of said slots positioned over previously wound coils to form a third group of coils; (o) insulating the portions of the coils in said third group that extend beyond the ends of the core; (p) indexing the core one step; (q) winding three coils simultaneously with both sides of each coil positioned in the tops of said winding slots over previously wound coils; (r) indexing the core one step; (s) winding three coils simultaneously with both sides of each coil positioned in the tops of said winding slots over previously wound coils to form a fourth group of coils; (t) insulating the portions of the coils in said fourth group that extend beyond the ends of the core; (u) interconnecting the coils electrically to provide an electrically balanced three phase, four pole winding.

References Cited by the Examiner
UNITED STATES PATENTS

| | | | |
|---|---|---|---|
| 2,874,318 | 1/1954 | Glazier et al. | 310—202 X |
| 2,904,269 | 9/1959 | Eminger | 242—1.1 |
| 2,998,937 | 9/1961 | Potter et al. | 242—1.1 X |
| 3,044,150 | 7/1962 | Higley | 242—1.1 X |

JOHN F. CAMPBELL, *Primary Examiner.*

R. W. CHURCH, *Assistant Examiner.*